(12) United States Patent
Braga et al.

(10) Patent No.: US 12,091,152 B2
(45) Date of Patent: Sep. 17, 2024

(54) AIRCRAFT DOOR SEALS AND LAP JOINT JUNCTION SEAL ASSEMBLIES THEREOF

(71) Applicant: EMBRAER S.A., São José dos Campos (BR)

(72) Inventors: Thyago Santos Braga, São José dos Campos (BR); Leandro Miglioranza, São José dos Campos (BR); Luís Henrique Dos Santos Silva, São José dos Campos (BR); Rodrigo Soares De Freitas, São José dos Campos (BR); Wanderley Montoro, São José dos Campos (BR)

(73) Assignee: EMBRAER S.A., São José dos Campos (BR)

( * ) Notice: Subject to any disclaimer, the term of this patent is extended or adjusted under 35 U.S.C. 154(b) by 281 days.

(21) Appl. No.: 17/836,413

(22) Filed: Jun. 9, 2022

(65) Prior Publication Data

US 2023/0399094 A1 Dec. 14, 2023

(51) Int. Cl.
*B64C 1/14* (2006.01)
*E06B 7/23* (2006.01)

(52) U.S. Cl.
CPC .......... *B64C 1/1461* (2013.01); *B64C 1/1415* (2013.01); *E06B 7/23* (2013.01)

(58) Field of Classification Search
CPC .......... F16J 15/027; F16J 15/022; E06B 7/16; E06B 7/23; B64C 1/1415; B64C 1/1461
See application file for complete search history.

(56) References Cited

U.S. PATENT DOCUMENTS

| | | | | |
|---|---|---|---|---|
| 4,167,258 A | * | 9/1979 | Robertson | B64C 1/1415 244/129.5 |
| 5,150,542 A | * | 9/1992 | Hannya | B60J 10/32 49/484.1 |
| 5,296,067 A | * | 3/1994 | Mesnel | B60J 10/244 156/289 |
| 6,112,469 A | * | 9/2000 | Vuillemot | E06B 7/2303 49/498.1 |
| 9,371,682 B2 | * | 6/2016 | Van Camp | E06B 1/70 |

(Continued)

FOREIGN PATENT DOCUMENTS

| | | | | |
|---|---|---|---|---|
| CA | 3064052 A1 | * | 7/2020 | .......... B64C 1/1415 |
| DE | 102015113471 A1 | * | 2/2017 | .............. B64C 1/14 |

(Continued)

*Primary Examiner* — Eugene G Byrd
(74) *Attorney, Agent, or Firm* — NIXON & VANDERHYE P.C.

(57) ABSTRACT

Aircraft door seals, especially door seals for aircraft cargo doors, include individual door seal sections joined together by a lap joint assembly. The door seal sections may have abutted ends establishing a seal junction, and a lap joint junction seal assembly to sealingly join the abutted ends of the door seal sections, wherein the lap joint junction seal assembly includes (i) a lap joint member having a lap joint base and a lap joint shelf extending from the lap joint base and sealingly engaged with a lower surface of the door seal sections over the seal junction, and (ii) an interior support spigot inserted within the interior space of each of the door seal sections at the abutted ends thereof. Each of the door seal sections may be a hollow profiled door seal defining the interior space and formed of an elastomeric sealing material.

20 Claims, 7 Drawing Sheets

(56) References Cited

U.S. PATENT DOCUMENTS

| | | | |
|---|---|---|---|
| 11,306,967 B2* | 4/2022 | Rotter | F16J 15/3252 |
| 11,565,786 B2* | 1/2023 | Heeren | B64C 1/14 |
| 2015/0344122 A1* | 12/2015 | Paul | B64C 1/1461 |
| | | | 244/129.5 |
| 2018/0298679 A1* | 10/2018 | Matsuura | E06B 7/2312 |
| 2019/0016202 A1* | 1/2019 | Matsuura | B60J 10/76 |
| 2020/0048957 A1* | 2/2020 | Jaskiewicz | E06B 7/23 |
| 2020/0062371 A1* | 2/2020 | Hackenberg | B64F 5/10 |
| 2021/0102425 A1* | 4/2021 | Webb | E06B 3/485 |

FOREIGN PATENT DOCUMENTS

| | | | | |
|---|---|---|---|---|
| EP | 3514052 A1 * | 7/2019 | | B64C 1/1423 |
| EP | 3527485 A1 * | 8/2019 | | B64C 1/14 |
| WO | WO-9924279 * | 3/1999 | | B60J 10/21 |

* cited by examiner

AIRCRAFT DOOR SEALS AND LAP JOINT JUNCTION SEAL ASSEMBLIES THEREOF

FIELD

The embodiments disclosed herein relate generally to aircraft door seals and especially to lap joint junctions for sealingly joining adjacent individual sections of such aircraft door seals.

BACKGROUND

Currently, one of the major problems affecting aircraft fleets is the time and cost of door seal maintenance. This problem can be highly accentuated for military cargo aircraft where the ramp/door seals have relatively large perimetrical dimensions when compared with the seal dimensions required for passenger doors. Most of the conventional seals for such cargo aircraft doors are formed as an integral contiguous seamless structure which thereby requires the entire seal to be completely replaced in case of damage. Seal replacement for such cargo doors also sometimes requires the removal and reinstallation of the door, installing a new seal and gluing the new seal in the associated seal track. These issues associated with conventional aircraft cargo door seals can thereby in turn lead to high costs and aircraft grounding time that can affect mission readiness.

The issues noted above with respect to conventional integral contiguous seamless seal structures are due in large part to the difficulty of developing and providing a suitable joint that withstands disengagement without affecting the pressurization and/or entry of electromagnetic waves from high intensity radiated fields (HIRF) that may be found in military aircraft, especially such as military cargo aircraft.

It would therefore be highly desirable if non-integral seals with suitably configured lap joints could be provided that would in turn allow relatively greater dimensional cargo door seals to be more easily installed and/or replaced. It is towards providing such solutions that the embodiments disclosed herein are directed.

SUMMARY OF DISCLOSED EMBODIMENTS

Broadly, the embodiments disclosed herein are directed toward aircraft door seals, especially door seals for aircraft cargo doors that include non-integral partitioned door seal sections with each end of one section being joined together with an adjacent abutted end of another door seal section by a lap joint assembly. According to certain embodiments, therefore, aircraft door seals may be provided which include door seal sections having abutted ends establishing a seal junction, and a lap joint junction seal assembly to sealingly join the abutted ends of the door seal sections, wherein the lap joint junction seal assembly comprises (i) a lap joint member having a lap joint base and a lap joint shelf extending from the lap joint base and sealingly engaged with a lower surface of the door seal sections over the seal junction, and (ii) an interior support spigot inserted within the interior space of each of the door seal sections at the abutted ends thereof. Each of the door seal sections may be a hollow profiled door seal defining the interior space and formed of an elastomeric sealing material.

Certain embodiments will be provided with a lap joint shelf that is arcuately shaped in conformity with the lower surface of the door seal sections. The interior support spigot will also preferable have a cross-sectional shape in conformity with a cross-sectional shape of the interior spaces of the door seal sections. Each of the lap joint member and the interior support spigot may be formed of an elastomeric seal material which is the same as or different from one another. The lap joint member may also be in the form of a one-piece structure which includes the lap joint base and the lap joint shelf.

The door seal sections may be provided with at least one door seal mounting bead which is adapted to being positioned within a concavely recessed mounting trough defined by the lap joint base. In certain embodiments, the door seal sections may include a pair of oppositely extending door seal mounting beads, wherein a lower one of the door seal mounting beads is positioned within the recessed mounting trough of the lap joint base. The lap joint base may itself include a lap joint mounting bead.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION OF EMBODIMENTS

Figure 1:
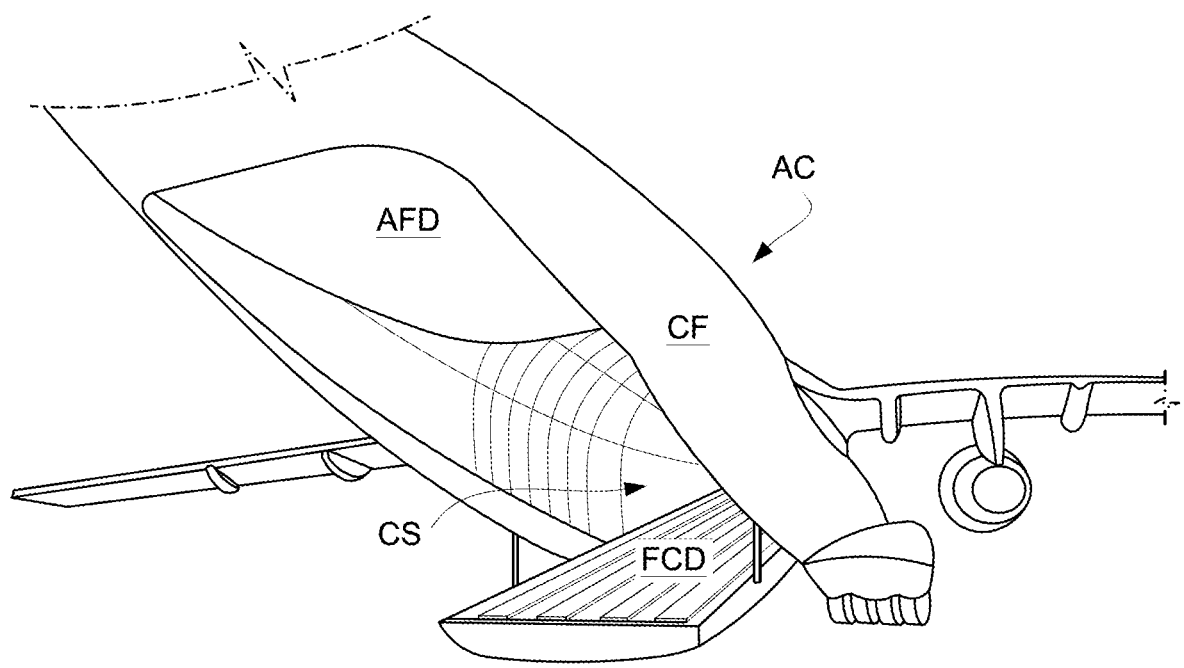
FIG. 1 is a rear perspective view of a typical military cargo aircraft equipped with clamshell-type cargo doors which include the door seals according to the embodiments described herein.

Accompanying FIG. 1 shows an aft view of an exemplary military style cargo aircraft CA which includes oppositely hinged forward and aft cargo doors FCD and ACD, respectively, which when opened in the state shown will allow access to the interior cargo space CS of the cargo aircraft CA within the aircraft's fuselage CF. Each of the cargo doors FCD and ACD may be operably provided about its respective peripheral edge with a door seal in accordance with the embodiments described herein, so that when the doors FCD and ACD are closed, the cargo space within the fuselage CF may be pressurized. In the interests of clarity of presentation, the door seal 10 in accordance with an embodiment of the herein described invention is not shown in FIG. 1 but is depicted in FIG. 2 in relation to the aft cargo door AFD.

Figure 2:
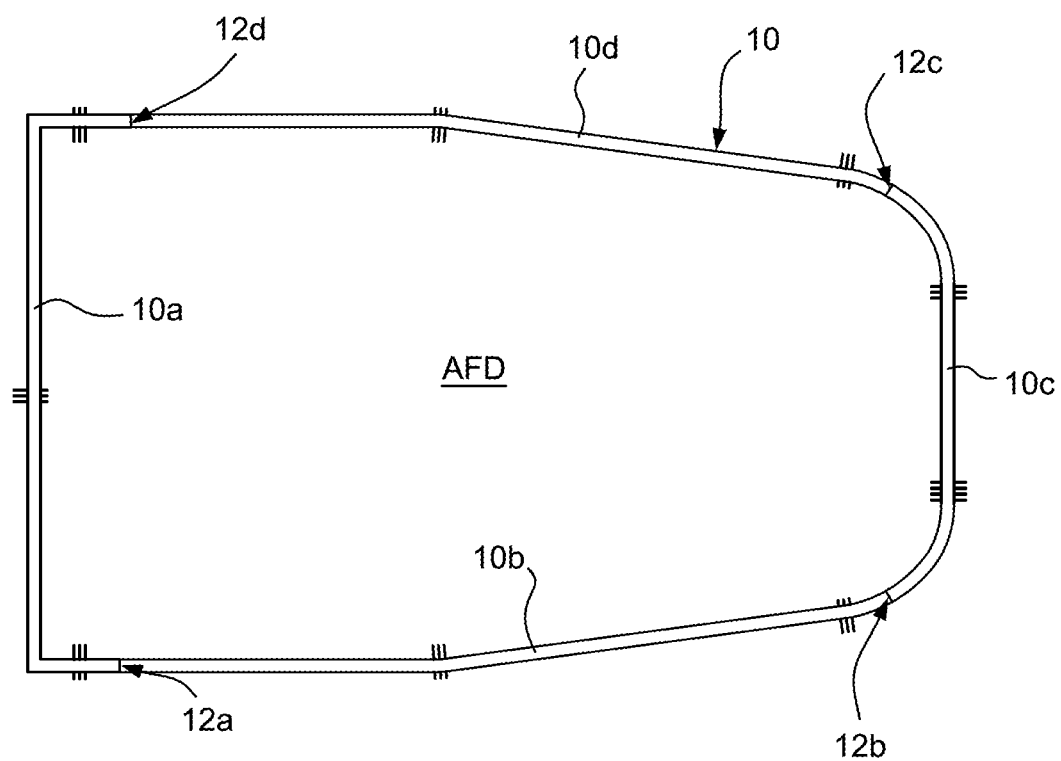
FIG. 2 is a schematic plan view of a representative seal that may be associated with a perimetrical edge of the aft cargo door of the aircraft depicted in FIG. 1 showing the sectionally partitioned seal sections and the lap joint junctions for sealably joining adjacent ends of abutting seal sections.

As shown in FIG. 2, the door seal 10 is comprised of a plurality of individual door seal sections 10a-10d that are contiguously positioned in sequence about and fixed to the perimeter of the door AFD. Each of the seal sections 10a-10d is comprised of an elongate profiled tubular seal body formed of a suitable elastomeric material (e.g. a thermoplastic elastomer) that is compressible under pressure when the door AFD is closed to seal the same, yet is capable of resiliently expansion upon release of the pressure when the door AFD is opened. The abutting adjacent pairs of adjacent ends of the door seal sections will thus form respective door seal junctions 12a-12d. The door seal junction 12a is shown in greatly enlarged manner for clarity of presentation in accompanying FIGS. 3-7 and is representative of the other seal junctions 12b-12d of the door seal 10. Thus, the discussion below with respect to the seal sections 10a and 10b and the lap joint junction 12a formed at the abutting adjacent ends thereof will be representative of all other seal sections 10c and 10d and all other lap joint junctions 12b-12d.

Figure 2A:
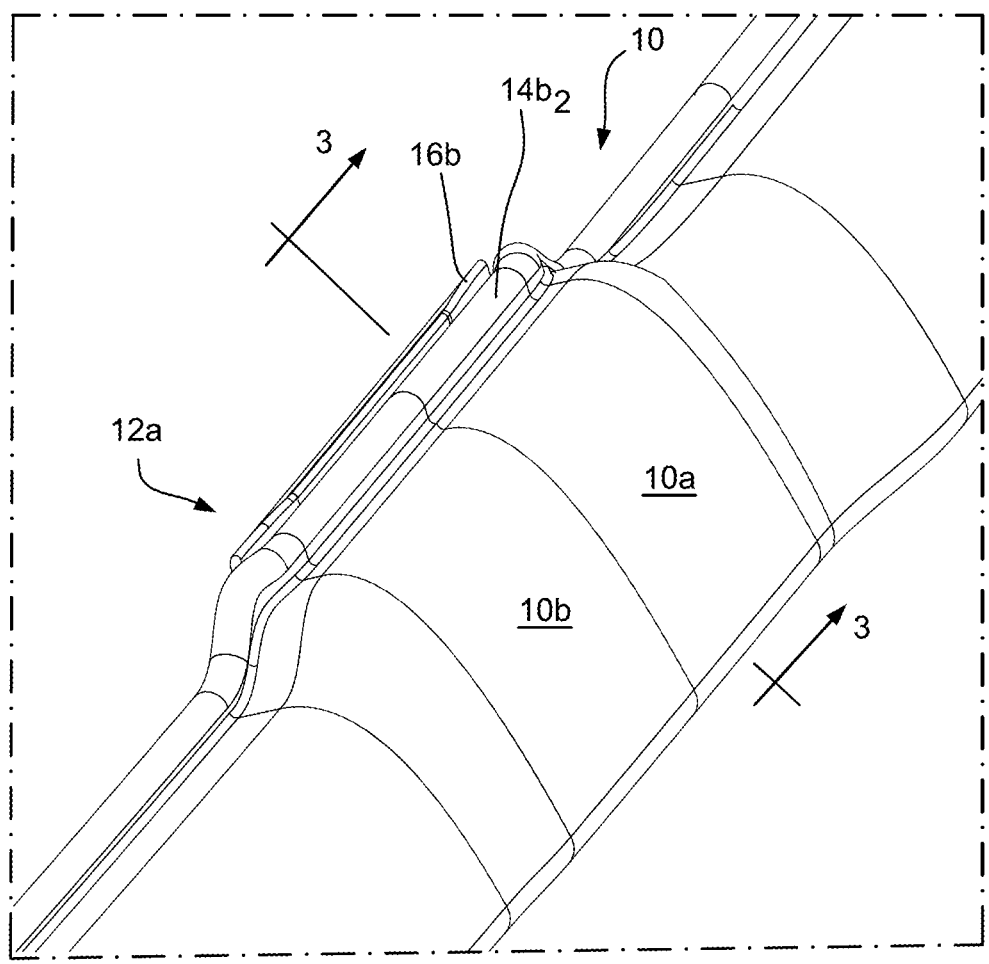
FIG. 2A is an enlarged top perspective view of a representative lap joint assembly for joining the abutted door seal sections as shown in FIG. 2 with the structures to mount the door seal sections to the perimetrical edge of the door omitted in the interests of greater clarity.
Figure 3:
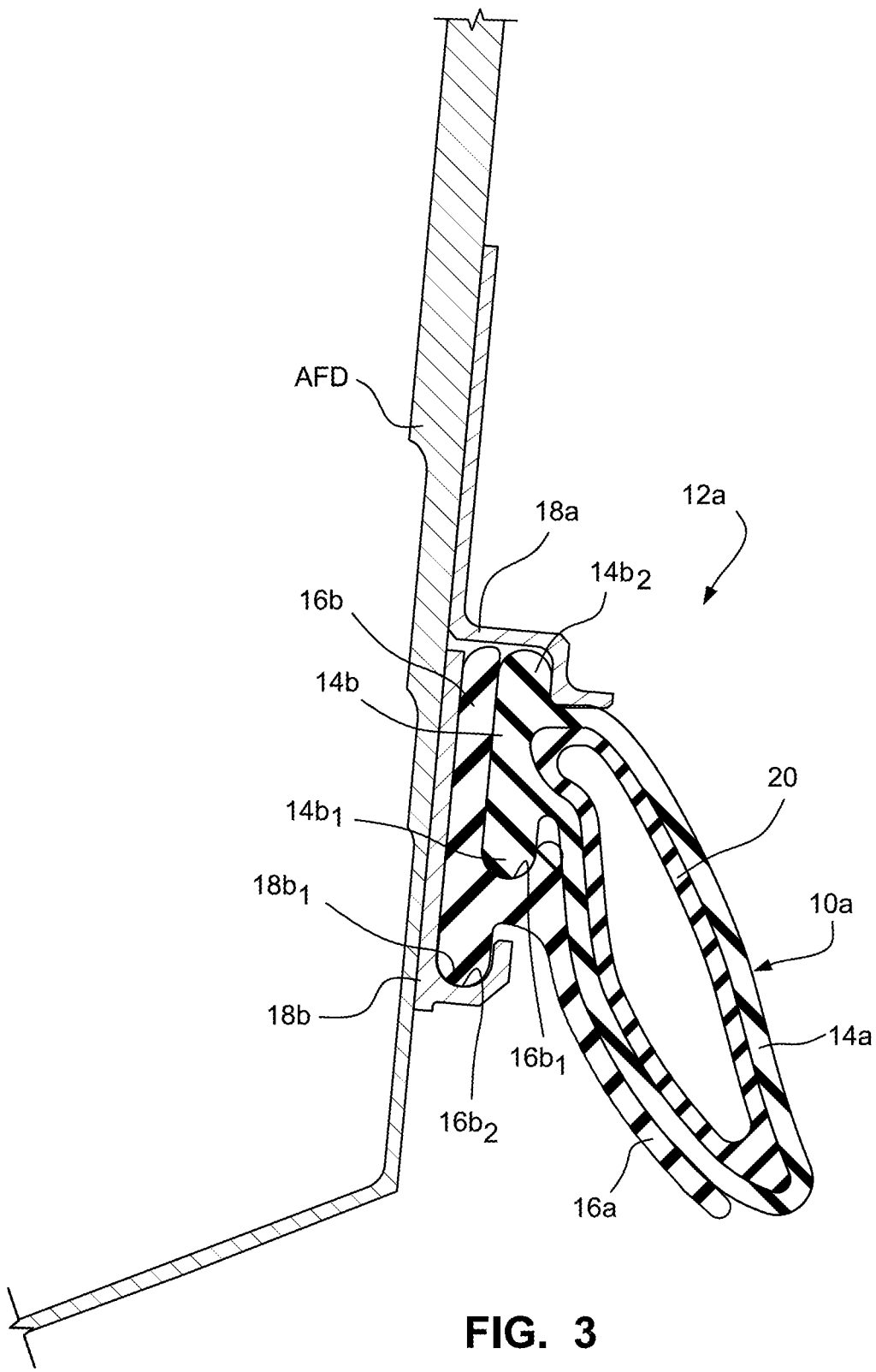
FIG. 3 is cross-sectional elevational view of the lap joint assembly as taken along lines 3-3 in FIG. 2 but showing the structures to mount the door seal sections to the perimetrical edge of the door.
Figure 4:
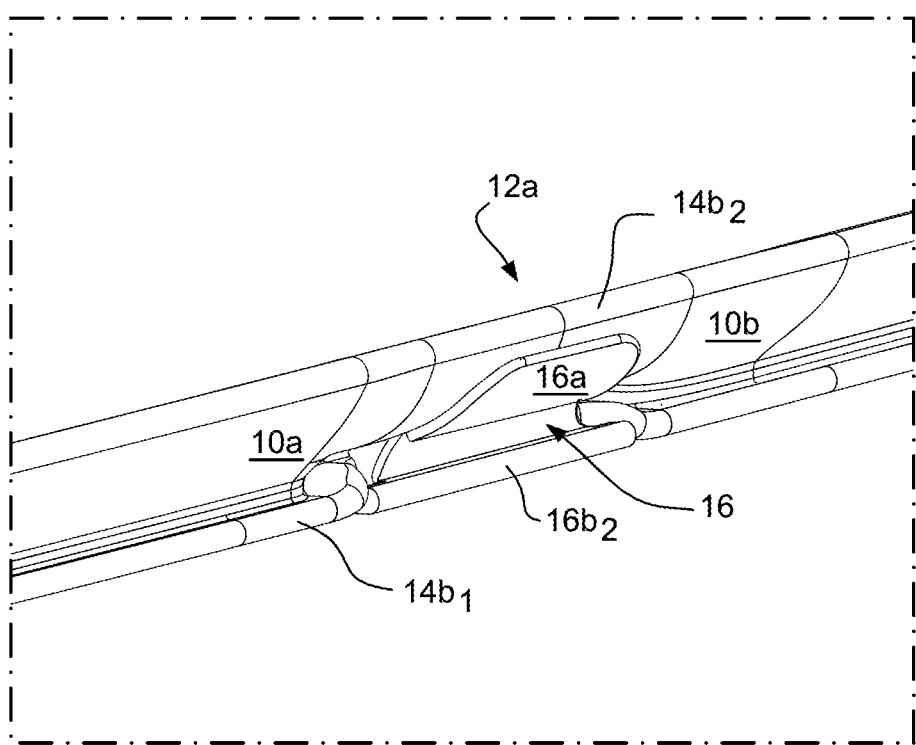
FIG. 4 is an enlarged bottom perspective view of the lap joint shown in FIG. 2.

As is perhaps more clearly shown in FIGS. 2A and 3, the seal section 10a is a one-piece (unitary) structure having a cross-sectional profile that is comprised of an extended seal flap portion 14a and a mounting base portion 14b. As shown in FIG. 3, the seal flap portion 14a extends outwardly and sloped relative to the edge structures of the door AFD so as to be deflected toward such edge structures when the door is closed to seal the same. The seal flap portion 14a is also tubular, i.e., defines an interior space, in the general cross-sectional profile shape of the seal section 10a. The specific cross-sectional profile of the seal section 10a is not crucial provided that it serves the purpose of sealing the aircraft door when closed. That is, the interior space of the seal section may be resiliently compressed somewhat while the seal flap portion 14a is resiliently deflected toward the edge structures of the door AFD when the door is closed so as to provide a sealing effect around the door's perimetrical edge.

The door seal junction 12a will further include a one-piece lap joint member 16 that includes an arcuate lap joint shelf 16a which is in sealing supporting contact with a lower surface of the seal flap portion 14a. The lap joint member 16 also includes a joint base 16b that defines a concavely recessed mounting trough 16b1 that is sized and configured to accept therein the a lower mounting bead 14b1 associated with the mounting base portion 14b of the seal section 10a. An upper mounting bead 14b2 of the mounting base portion 14b is compressively held against the perimetrical edge structures of the door AFD by an upper mounting clip 18a. The lower end of the joint base 16b includes a lap joint mounting bead 16b2 which is in turn received within a concavely recessed mounting trough 18b1 defined by the lower mounting clip 18b. The lap joint member 16 is most preferably formed of an elastomeric seal material so as to be flexibly deformed when the door AFD is closed yet possess sufficient resiliency to return to an undeformed state when the door AFD is opened.

Connection of the abutted ends of the seal sections 10a and is provided by an interior support spigot 20 having a cross-sectional profile corresponding to the cross-sectional profile of the interior space of the seal sections 10a and 10b. The support spigot 20 is has a lengthwise dimension to allow one lengthwise portion to be received within the hollow interior space of the seal section 10a and an opposite lengthwise portion to be received in the hollow interior space of the seal section 10b when the ends of the seal sections 10a, 10b are abutted against one another. Like the seal sections 10a, 10b, the support spigot 20 is formed of an elastomeric material is compressible under pressure when the door AFD is closed to seal the same, yet is capable of resiliently expansion upon release of the pressure when the door AFD is opened.

Figure 5:
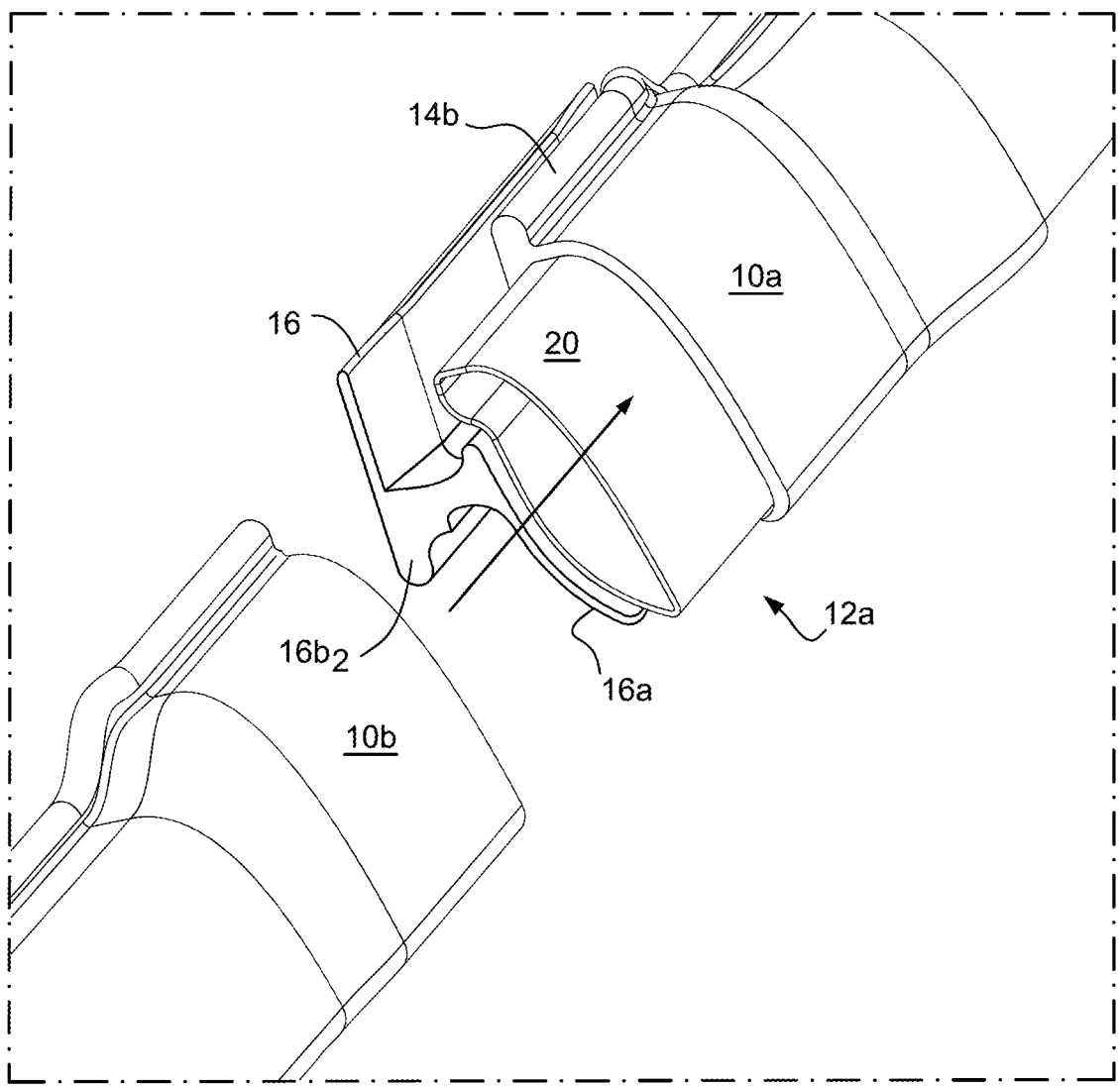
FIG. 5 is an exploded top perspective view showing the manner in which the lap joint assembly is formed.
Figure 6:
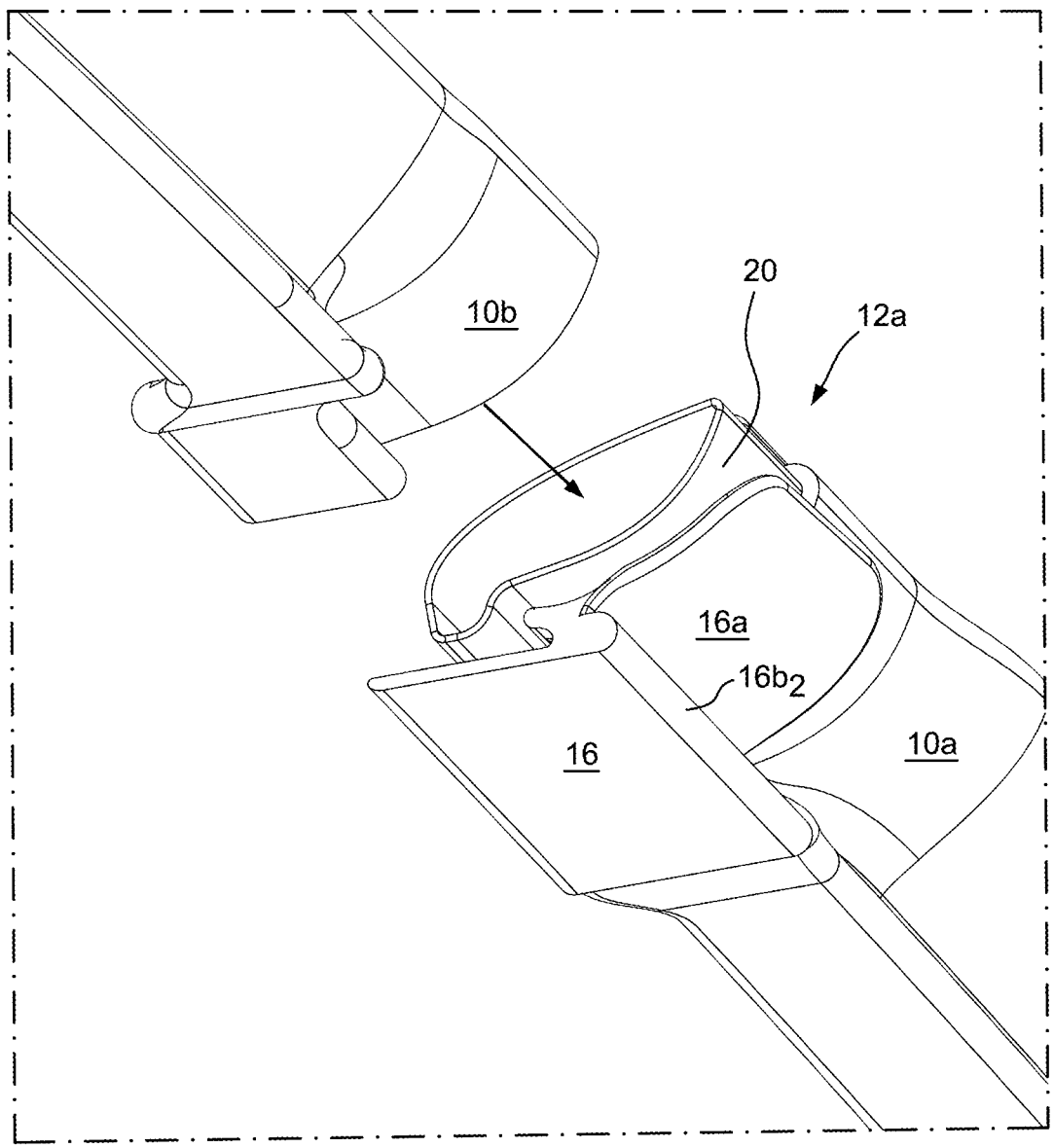
FIG. 6 is an exploded bottom perspective view showing the manner in which the lap joint assembly is formed.
Figure 7:
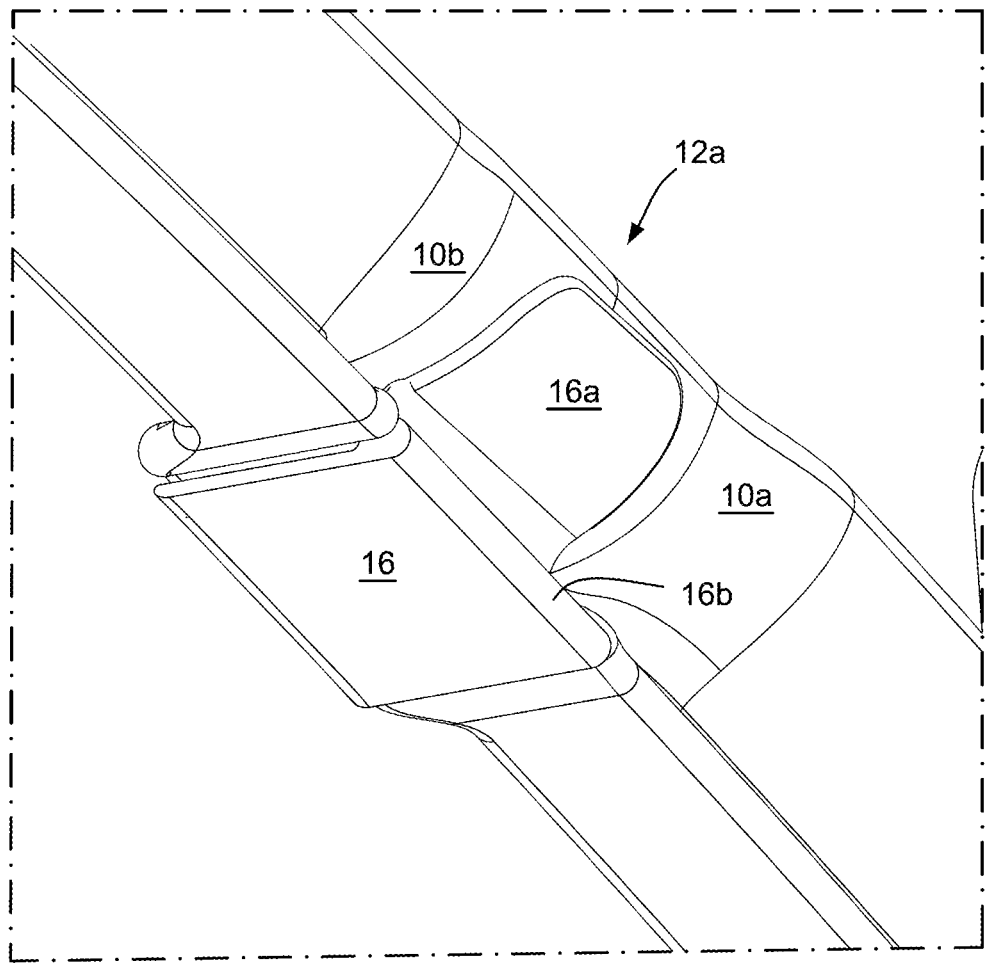
FIG. 7 is a bottom perspective view showing the lap joint assembly when completed.

The lap joint assembly 12a may be assembled in the manner depicted in accompanying FIGS. 5-7. In this regard, a lengthwise portion of the support spigot 20 may be inserted into the hollow space of the seal section 10a so as to extend outwardly from the terminal end thereof. At this time, the mounting bead 14b1 of the seal section 10a may be positioned within the mounting trough 16b1 of the joint base 16. The seal section 10b may then be sleeved over the exposed lengthwise extent of the support spigot 20 until the terminal ends of each seal section 10a, 10b are in abutting contact with one another. At this time, the mounting bead 14b1 of the seal section 10b may likewise be positioned within the mounting trough 16b1 of the joint base 16. Although not shown, the mounting bead 16b2 of the lap joint member 16 may be positioned within the recessed mounting trough 18b1 of the lower mounting clip 18b. Thereafter, the mounting clip 18a may be installed so as to secure the lap joint assembly to the perimetrical edge of the door AFD.

While reference is made to a particular embodiment of the invention, various modifications within the skill of those in the art may be envisioned. Therefore, it is to be understood that the invention is not to be limited to the disclosed embodiment, but on the contrary, is intended to cover various modifications and equivalent arrangements included within the spirit and scope thereof.

What is claimed is:

1. An aircraft door seal comprising:
   door seal sections defining an interior space and having abutted ends establishing a seal junction; and
   a lap joint junction seal assembly to sealingly join the abutted ends of the door seal sections, wherein the lap joint junction seal assembly comprises:
   (i) a lap joint member having a lap joint base and a lap joint shelf extending from the lap joint base and sealingly engaged with a lower surface of the door seal sections over the seal junction; and
   (ii) an interior support spigot inserted within the interior space of each of the door seal sections at the abutted ends thereof.

2. The aircraft door seal according to claim 1, wherein each of the door seal sections is a hollow profiled door seal defining the interior space and formed of an elastomeric sealing material.

3. The aircraft door seal according to claim 1, wherein the lap joint shelf is arcuately shaped in conformity with the lower surface of the door seal sections.

4. The aircraft door seal according to claim 3, wherein the interior support spigot has a cross-sectional shape in conformity with a cross-sectional shape of the interior spaces of the door seal sections.

5. The aircraft door seal according to claim 4, wherein each of the lap joint member and the interior support spigot is formed of an elastomeric seal material.

6. The aircraft door seal according to claim 5, wherein the lap joint member is a one-piece structure which includes the lap joint base and the lap joint shelf.

7. The aircraft door seal according to claim 1, wherein
the door seal sections include at least one door seal mounting bead, and wherein
the lap joint base defines a concavely recessed mounting trough in which the at least one door seal mounting bead of the door seal sections is positioned.

8. The aircraft door seal according to claim 7, wherein the door seal sections include a pair of oppositely extending door seal mounting beads, wherein a lower one of the door seal mounting beads is positioned within the recessed mounting trough of the lap joint base.

9. The aircraft door seal according to claim 1, wherein the lap joint base includes a lap joint mounting bead.

10. An aircraft comprising:
a fuselage, and
a door to close an opening in the fuselage, wherein the door includes the aircraft door seal according to claim 1.

11. A lap joint junction seal assembly comprising:
(i) a lap joint member having a lap joint base and a lap joint shelf extending from the lap joint base and adapted to being sealingly engaged with a lower surface of abutted ends of door seal sections over a seal junction thereof; and
(ii) an interior support spigot adapted to being inserted within interior spaces of each of the door seal sections at the abutted ends thereof, wherein
the lap joint member and the interior support spigot cooperate to seal the seal junction of the abutted ends of the door seal sections.

12. The lap joint junction seal assembly according to claim 11, wherein the lap joint shelf is arcuately shaped in conformity with the lower surface of the door seal sections.

13. The lap joint junction seal assembly according to claim 12, wherein the interior support spigot has a cross-sectional shape in conformity with a cross-sectional shape of the interior spaces of the door seal sections.

14. The lap joint junction seal assembly according to claim 13, wherein each of the lap joint member and the interior support spigot is formed of an elastomeric seal material.

15. The lap joint junction seal assembly according to claim 14, wherein the lap joint member is a one-piece structure which includes the lap joint base and the lap joint shelf.

16. The lap joint junction seal assembly according to claim 11, wherein the lap joint base defines a concavely recessed mounting trough adapted to receive therein door seal mounting beads of the door seal sections.

17. The lap joint junction seal assembly according to claim 11, wherein the lap joint base includes a lap joint mounting bead.

18. An aircraft comprising:
a fuselage, and
a door to close an opening in the fuselage, wherein
the door includes a door seal comprised of a plurality of door seal sections positioned in abutting end-to-end manner about a perimetrical edge of the door to thereby establish a plurality of seal junctions between abutted adjacent ends thereof, and
a plurality of lap joint junction seal assemblies each being operatively associated with a respective one of the seal junctions, wherein each of the lap joint seal assemblies is the lap joint seal assembly according to claim 11.

19. The aircraft according to claim 18, wherein the aircraft is a cargo aircraft, and wherein the door is a cargo door of the cargo aircraft.

20. A method of forming the aircraft door seal according to claim 1, comprising:
(a) providing the door seal sections;
(b) inserting a lengthwise portion of the interior support spigot into the interior space of a first one of the door seal sections;
(c) inserting a remaining lengthwise portion of the interior support spigot into the interior space of a second one of the door seal sections and positioning the ends of the first and second ones of the door seal sections in abutting relationship so as to join the first and second ones of door seal sections to one another and thereby establish the seal junction thereof; and thereafter
(d) installing the first and second ones of the door seal sections joined according to step (c) with the lap joint member so that the lap joint shelf is sealingly engaged with the lower surface of the door seal sections.

* * * * *